United States Patent [19]
Sato

[11] Patent Number: 6,061,627
[45] Date of Patent: *May 9, 2000

[54] CURRENT POSITION CALCULATING SYSTEM FOR CORRECTING A DISTANCE FACTOR FOR CALCULATING A VEHICLE TRAVELLED DISTANCE

[75] Inventor: Hiroyuki Sato, Yamato, Japan

[73] Assignee: Xanavi Informatics Corporation, Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/635,115

[22] Filed: Apr. 19, 1996

[30] Foreign Application Priority Data

Apr. 21, 1995 [JP] Japan .................................... 7-097197

[51] Int. Cl.$^7$ .................................................. G06F 165/00
[52] U.S. Cl. .......................... 701/207; 701/208; 701/214; 701/221; 340/988; 340/995
[58] Field of Search ..................................... 701/207, 208, 701/209, 210, 213, 214, 216, 220, 221, 72; 73/178 R; 340/988, 990, 995

[56] References Cited

U.S. PATENT DOCUMENTS

| | | | |
|---|---|---|---|
| 4,796,191 | 1/1989 | Honey et al. | 73/178 R |
| 4,807,127 | 2/1989 | Tenmoku et al. | 340/988 |
| 4,878,170 | 10/1989 | Zeevi | 340/988 |
| 4,937,752 | 6/1990 | Nanba et al. | 340/995 |
| 5,043,902 | 8/1991 | Yokoyama et al. | 340/988 |
| 5,130,709 | 7/1992 | Toyama et al. | 340/995 |
| 5,292,184 | 3/1994 | Takata | 701/72 |
| 5,416,477 | 5/1995 | Shibata | 340/988 |
| 5,539,647 | 7/1996 | Shibata et al. | 701/221 |
| 5,552,990 | 9/1996 | Ihara et al. | 340/988 |

FOREIGN PATENT DOCUMENTS

| | | |
|---|---|---|
| 0 607 654 A2 | 10/1993 | European Pat. Off. . |
| 1136013 | 5/1989 | Japan . |
| 2-107985 | 4/1990 | Japan . |
| 6-13972 | 1/1994 | Japan . |
| 6-27652 | 4/1994 | Japan . |

*Primary Examiner*—Gary Chin
*Attorney, Agent, or Firm*—Pennie & Edmonds LLP

[57] ABSTRACT

A microprocessor 214 obtains a vehicle travelled distance by multiplying the number of pulses by a distance factor R, the number of pulses having been outputted from a vehicle speed sensor 203 and having been counted by a counter 216. In addition, the microprocessor 214 estimates a current position on a road according to map data read out from a CD-ROM 205 via a driver 206, measured data from an angular velocity sensor 201 and a direction sensor 202 via A/D converters 209 and 210, and the obtained vehicle travelled distance. The road direction on the estimated current position and the vehicle direction obtained from the measured data of the angular velocity sensor 201 and the direction sensor 202, are compared, and in accordance with the angular difference therebetween and the information whether the driving road is a left turn or a right turn, it is determined whether the estimated current position is ahead or behind the actual position. With the result, the distance factor R can be dynamically modified. Therefore, it is possible to adequately correct the distance factor which is used for obtaining a travelled distance.

6 Claims, 12 Drawing Sheets

FIG.10A
LEFT TURN (CASE1)

FIG.10B
LEFT TURN (CASE2)

FIG.10C
RIGHT TURN (CASE3)

FIG.10D
RIGHT TURN (CASE4)

● ···CURRENT POSITION (B)
— ···VEHICLE DIRECTION
— ···ROAD DIRECTION
◁ ···ANGULAR DIFFERENCE BETWEEN ROAD AND VEHICLE DIRECTIONS
( | ANGULAR DIFFERENCE BETWEEN ROAD AND VEHICLE DIRESTIONS | ≧3deg )

FIG. 11

TABLE A

| INTEGRAL VALUE OF ANGULAR DIFFERENCE BETWEEN ROAD AND VEHICLE DIRECTIONS ($\Sigma \theta$) | Ta | |
|---|---|---|
| | LEFT TURN | RIGHT TURN |
| POSITIVE | POSITIVE | NEGATIVE |
| NEGATIVE | NEGATIVE | POSITIVE |

FIG. 12

CURRENT POSITION CALCULATING SYSTEM FOR CORRECTING A DISTANCE FACTOR FOR CALCULATING A VEHICLE TRAVELLED DISTANCE

BACKGROUND OF THE INVENTION

1. Field of the Invention

The present invention relates to a current position calculating system, which is installed on a mobile object such as a vehicle or the like, for measuring a travelled distance, a headed direction etc., and for calculating a current position of the vehicle according to the measured values. More particularly, it relates to techniques for reducing an error in measuring the travelled distance.

2. Description of Related Art

A current position of a vehicle is usually calculated on the basis of a headed direction of the vehicle, measured by a direction sensor, such as a gyrocompass, and a travelled distance of the vehicle measured by a vehicle speed sensor or a distance sensor.

Generally, a travelled distance of a vehicle is obtained by measuring the number of revolutions of a transmission output shaft or a tire, and multiplying the result by a distance factor, which corresponds to a distance the vehicle travelled for each revolution of the tire.

In addition, there is known a technique in which in order to correct an error in the current position obtained from the headed direction and the travelled distance as described above, the obtained current position of a vehicle is corrected so as to be the same as road data. This is called a map matching technique as disclosed in the official gazette of Japanese Patent Application Publication (KOKOKU) No. 13972/1994. This map matching technique can enhance an accuracy in calculating a current position.

Meanwhile, the diameter of a tire, which relates to a distance factor, varies continuously while driving, due to such factors as wearing away of the tire, or expansion caused by a temperature change. As a result, an error is generated in calculating the travelled distance and a highly accurate calculation of the current position cannot be performed. For example, one percent of error in the travelled distance factor for each revolution of the tire will result in an error of 1 kilometer if the travelled distance is 100 kilometers.

Such an error in measuring the travelled distance as described above can be corrected to a certain extent by using the aforementioned map matching technique if it is applied to driving on an ordinary road. However, in the event of driving on a highway or the like, particular features which can be utilized in the map matching technique are rarely encountered, such as sharp curves or intersections, and thus a correction of errors cannot be adequately performed.

Moreover, once an error of approximately 1 kilometer is produced between the estimated current position and the actual current position, it will be difficult to correct the position according to the map matching technique.

So far, the following techniques have been employed for avoiding errors in measuring a travelled distance:

(1) correcting a distance factor per revolution of a tire by comparing the road data from the point of turning at an intersection (a starting point) to the point of turning at the next intersection (a terminal point), with the travelled distance obtained by measuring the number of revolutions of a transmission output shaft or a tire; (2) correcting the aforementioned distance factor by comparing the distance between two beacons on a map, with the distance measured by driving as disclosed in the official gazette of Japanese Patent Application Publication (KOKOKU) No. 27652/1994; and (3) correcting the aforementioned distance factor by obtaining a vehicle speed from the GPS (Global Positioning System) receiving device for calculating a current position using the signals from the GPS satellites and comparing the obtained vehicle speed with a detected number of revolutions of a tire, as disclosed in the official gazette of Japanese Patent Application Laid-open (KOKAI) No. 107958/1990.

SUMMARY OF THE INVENTION

However, an accurate correction may not be performed in the technique (1) described above due to even a slight curve of the road or meandering of the vehicle. It is also difficult to precisely identify the aforementioned starting point and/or the terminal point. For example, in the event of turning at an intersection on plural-lane highways, the positions of the starting point and the terminal point vary depending on which lane has been taken, and it is not easy to identify such a lane.

Similarly, accurate correction may not be performed in the technique (2) in a condition where the road is not straight and there is also a problem of installing beacon equipment which can be used on a vehicle.

Moreover, in the technique (3), it is possible that accurate speed information cannot be obtained if a vehicle runs at a low speed, and an error may be produced in a calculated speed due to a long processing time in the case of a significant change in the vehicle speed, and thus there is a problem that accurate correction cannot be performed. Furthermore, it is necessary to install GPS receiving equipment and a GPS receiving antenna which can be used on a vehicle. There is also a problem that correction is disabled because of the absence of the GPS signals received when the vehicle is in such situations as passing through a tunnel, running under an elevated track or in the shade of buildings.

The present invention has for its object to offer a current position calculating system which can obtain a vehicle position with high accuracy by precisely correcting a distance factor, without considering any features of a driving road and a speed of a vehicle nor preparing any particular equipment.

In order to achieve the above object, a current position calculating system- for a vehicle and for calculating a current position of the vehicle, according to the present invention, comprises:

a storing section for storing map data representing a road map;

a headed direction detecting means for detecting a headed direction of the vehicle;

a rotational speed detecting means for detecting a rotational speed of a wheel of the vehicle;

a calculating means for calculating a travelled distance of the vehicle in accordance with the rotational speed of the wheel and a distance factor;

an estimating section for estimating a current position of the vehicle on a road, in accordance with the detected travelled distance, the detected headed direction and the road map represented by the map data; and a distance factor correction means for obtaining a turning point on a road where the estimated vehicle position is located on the basis of the road map represented by the map data and for correcting the distance factor in the following manner; when the detected headed direction of the vehicle indicates that the vehicle has made a turn before the estimated vehicle position reaches the obtained turning point, the distance factor obtained by the calculating section is corrected to be a larger value, and when the detected headed direction of the vehicle indicates that the vehicle has made a turn after the estimated vehicle position reaches the obtained turning point, the distance factor obtained by the calculating section is corrected to be a smaller value.

This current position calculating system of the present invention obtains a turning point on a road where a vehicle exists according to the map information represented by the map data, and when the detected headed direction of the vehicle indicates that the vehicle has made a turn before the estimated vehicle position reaches the obtained turning point, the distance factor obtained by the calculating section is smaller than a correct value, and thus is corrected to be a larger value. On the other hand, when the detected headed direction of the vehicle indicates that the vehicle has made a turn after the estimated vehicle position reaches the obtained turning point, the distance factor obtained by the calculating section is larger than a correct value, and thus it is corrected to be a smaller value.

According to the present invention, a distance factor can be adequately corrected without any particular features such as intersections on a driving road nor preparing any particular equipment for the GPS, etc. Moreover it is not necessary to directly depend on a driving speed for the correction.

DETAILED DESCRIPTION OF THE PREFERRED EMBODIMENTS

Now, there will be explained in detail with an embodiment of the present invention in that a distance factor can be adequately corrected according to a current position calculating system.

Figure 1:
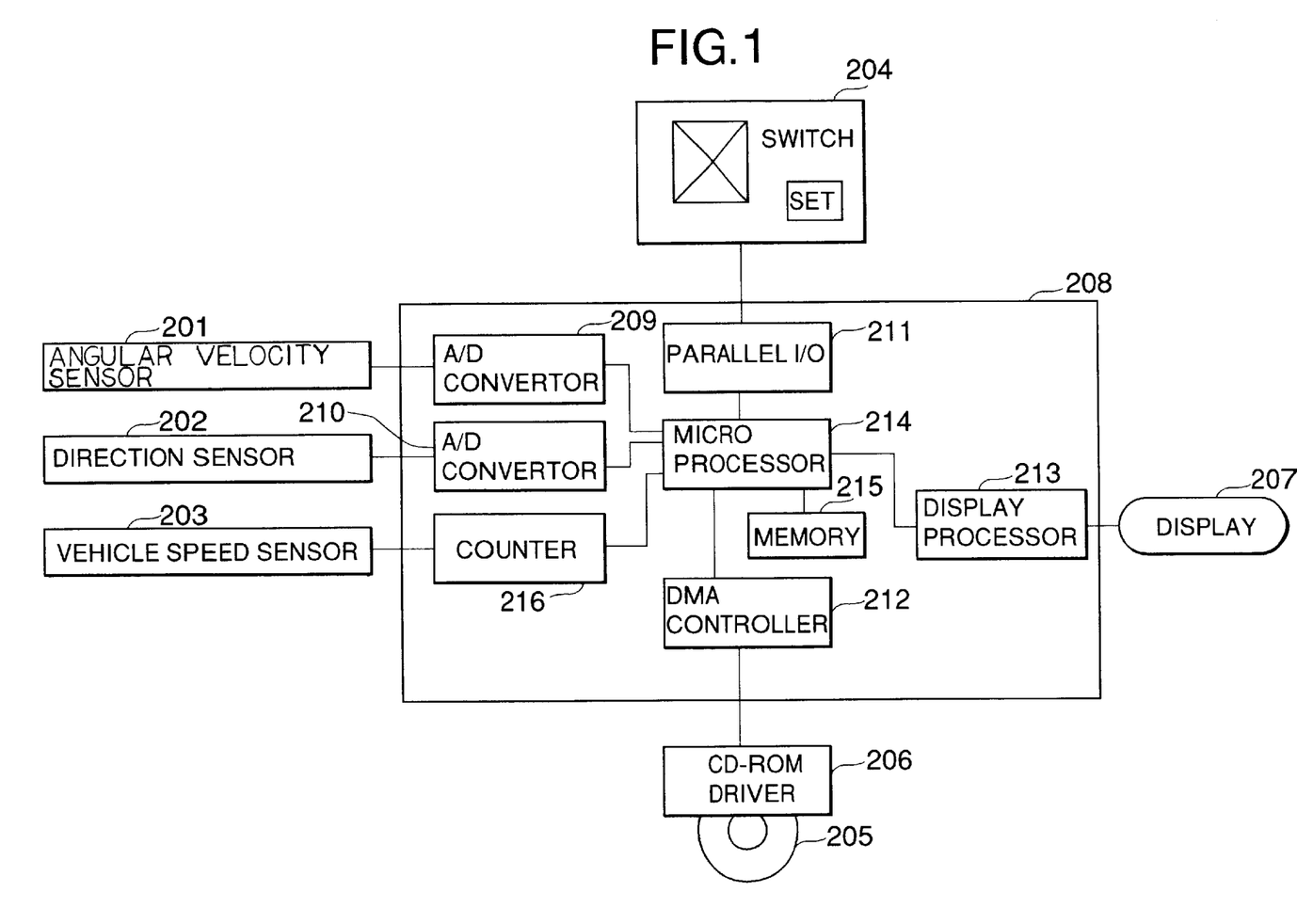
FIG. 1 is a block diagram showing a configuration of the current position calculating system in an embodiment of the present invention.

Referring to FIG. 1, a configuration of the current position calculation system according to an embodiment of the present invention will now be described.

The current position calculating system in this embodiment comprises an angular velocity sensor 201 for detecting a headed direction change by detecting the yaw rate of a vehicle, a direction sensor 202, such as a terrestrial magnetism sensor, for detecting the headed direction of the vehicle by detecting the terrestrial magnetism, and a vehicle speed sensor 203 for outputting pulses at given time intervals, the frequency being proportional to the rotational speed of the output shaft of a transmission.

It also comprises a display 207 which displays a map around a current position, a mark indicating the current position, etc., a switch 204 which receives a command from a user (a driver) for switching the scale of the map on the display 207, a CD-ROM 205 for storing the digital map data, and a driver 206 for reading the map data from the CD-ROM 205. In addition, a controller 208 is also provided for controlling the operations of each of the aforementioned peripheral equipments.

The controller 208 comprises an A/D converter 209 for converting the (analog) signal from the angular velocity sensor 201 to a digital form, an A/D converter 210 for converting the (analog) signal from the direction sensor 202 to a digital form, a counter 216 for counting the number of pulses outputted from the vehicle speed sensor 203 per 0.1 second, a parallel I/O 211 for inputting whether or not the switch 204 is pressed, a DMA (Direct Memory Access) controller 212 for transmitting the map data read from the CD-ROM 205, and a displaying processor 213 for displaying a map image on the display 207.

Figure 2:
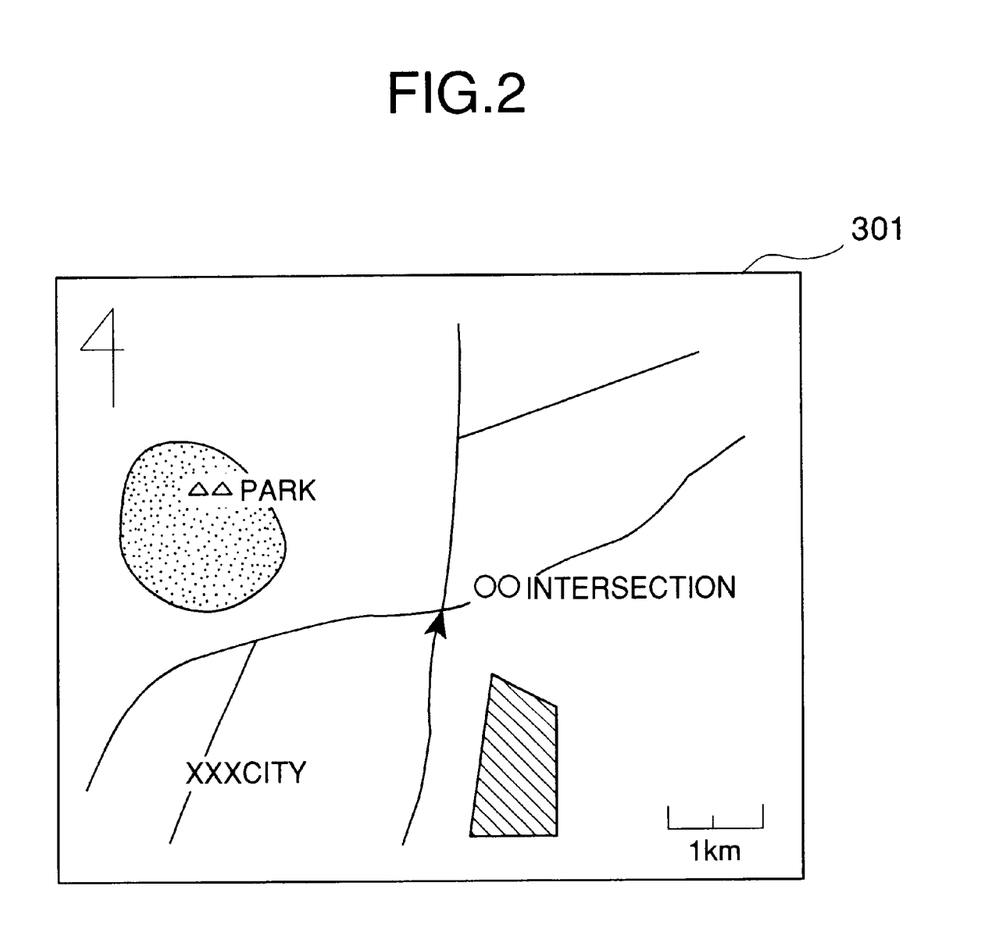
FIG. 2 is an illustration showing an example of display of a map and a current position in the embodiment of the present invention.

Moreover, the controller 208 is provided with a microprocessor 214 and a memory 215. The microprocessor 214 receives the signals from the angular velocity sensor 201 obtained via the A/D converter 209, the signals from the direction sensor 202 obtained via the A/D converter 210, the outputted number of pulses of the vehicle speed sensor 203 counted by the counter 216, the information as to whether or not the switch 204 has been pressed, inputted via the parallel I/O 211, and the map data from the CD-ROM 205 obtained via the DMA controller 212. The microprocessor executes a process on the basis of the above signals, calculates the current position of the vehicle, and displays the result on the display 207 via the display processor 213. As shown in FIG. 2, the vehicle position is indicated using an arrow or the like which is displayed on the already-displayed map on the display 207, so that a user is able to know the current position of the vehicle on the map. The memory 215 includes a ROM that stores programs defining the contents of processes (which will be described below) for executing the aforementioned operations and various tables described below, and a RAM for use as a working area when the microprocessor 214 executes the processes.

Hereinafter, operations of the current position calculating system in the embodiment will be explained.

At first, three processes will be described, that is, a process for calculating a headed direction and a travelled distance of a vehicle, a process for determining a current position of the vehicle according to the calculated headed direction and the calculated travelled distance, and a process for displaying the obtained position and direction of the vehicle.

Figure 3:
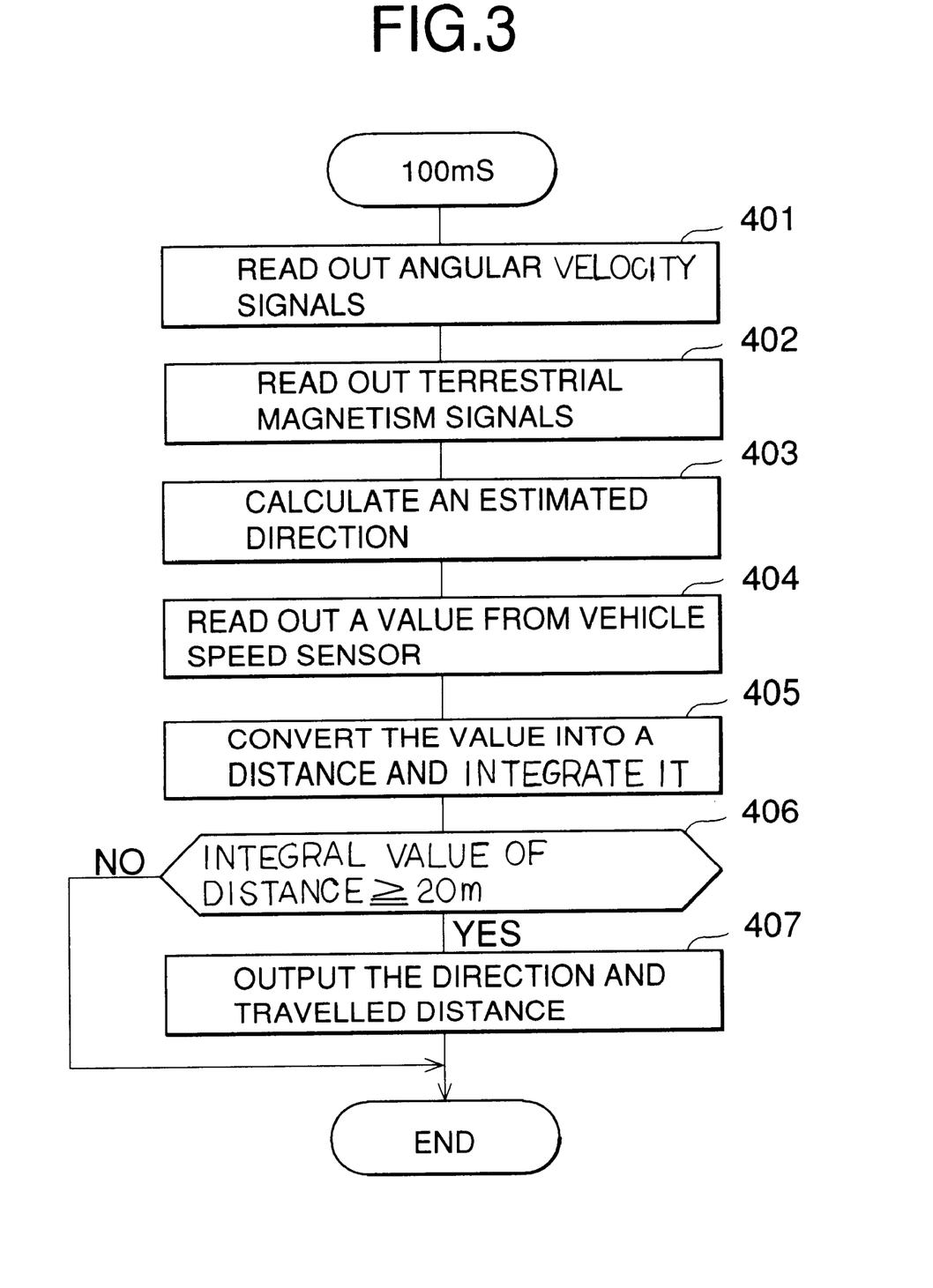
FIG. 3 is a flow chart showing a process for calculating a headed direction and a distance in the embodiment of the present invention.

Referring to FIG. 3, a flow of the process for calculating a headed direction and a travelled distance of a vehicle will be described.

This is a routine of the microprocessor 214, which is executed at regular intervals, for example, every 100 ms.

In this routine, firstly, an output value of the angular velocity sensor 201 is read in from the A/D convertor 209 (step 401). Only a relative value (change) of the headed direction of the vehicle can be detected since the output value of the angular velocity sensor 201 represents a direction change. Therefore, secondly, an output value from the direction sensor 202 is read in from the A/D converter 210 (step 402) and an estimated direction of the vehicle is determined according to an absolute direction calculated from the output value of the direction sensor 202 and the direction change (an angular velocity output) outputted from the angular velocity sensor 201 (step 403).

Since an error produced in the angular velocity sensor 201 is likely to be large if the vehicle speed remains low for a long time, the determination of the direction is performed by utilizing only the direction outputted from the direction sensor 202 in the case where the vehicle speed remains low for more than a predetermined period of time.

Next, the number of pulses outputted from the vehicle speed sensor 203 is counted every 0.1 second by the counter 216, and the counted value is read in (step 404). The travelled distance for 0.1 second is obtained by multiplying this read-in value by a distance factor R (step 405). The method for obtaining the distance factor R will be described below.

Next, the travelled distance value per 0.1 second which has been obtained as described above, is added to the previously obtained value, namely integrated, and it is checked whether or not the sum of the travelled distance has reached, for example, 20 meters (step 406). If the integral value is less than 20 meters ("No" in step 406), the current process is ended and thereafter a new process will be started again.

As a result of the calculation of the travelled distance, if the integrated travelled distance has reached a predetermined value, for example, 20 meters ("Yes" in step 406), the headed direction and the travelled distance (20 meters) at that point in time are outputted (step 407). Additionally, in step 407, the integrated distance is initialized and another integration of the travelled distance is started.

As a second process, the process for obtaining a current position of the vehicle according to a calculated headed direction and a calculated travelled distance will be described.

Figure 4:
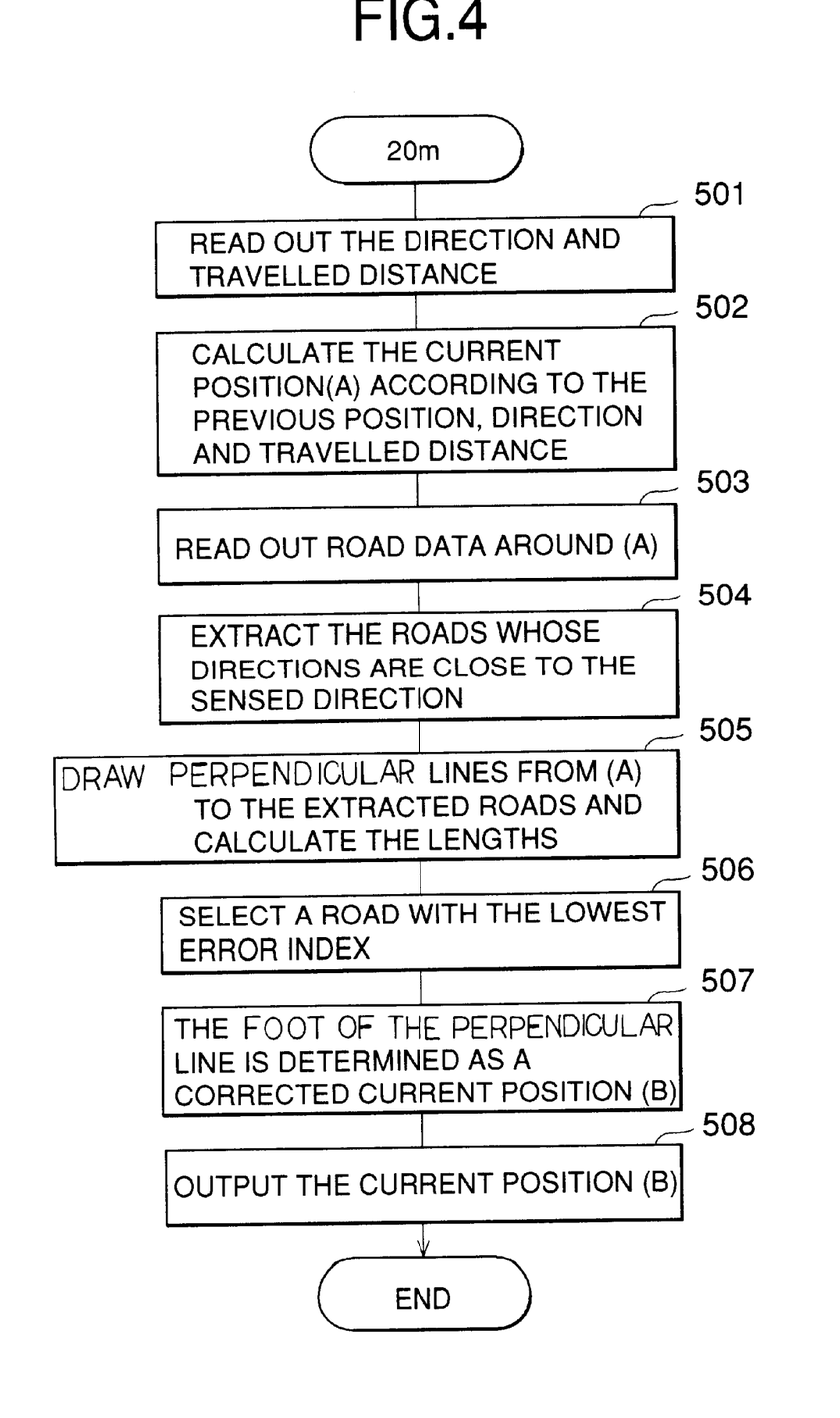
FIG. 4 is a flow chart showing a process for calculating a current position in the embodiment of the present invention.

Referring to FIG. 4, there is shown a flow of the process.

This process is triggered by receiving the output of the headed direction and the travelled distance from the process shown in FIG. 3, and executed as a routine of the microprocessor 214. In other words, this process is started up every time a vehicle travels 20 meters.

In this step, firstly, the headed direction and the travelled distance outputted from step 407 are read in (step 501). Secondly, amounts of the vehicle movement in the latitudinal direction and in the longitudinal direction are respectively obtained, and the amounts of movement in the respective directions are added to the corresponding values indicating the current position which have been obtained in the previous process to determine the current position (A) (step 502).

If there is no previously obtained current position, for example, just after starting the equipment, a predetermined position is used as a previously obtained current position to determine the current position (A).

Next, a map of the periphery of the current position (A) is read out from the CD-ROM 205, via the driver 206 and the DMA controller 212, and road data (line segments) within the area of a predetermined distance D, the center thereof being the current position (A) (step 503).

Figure 6:
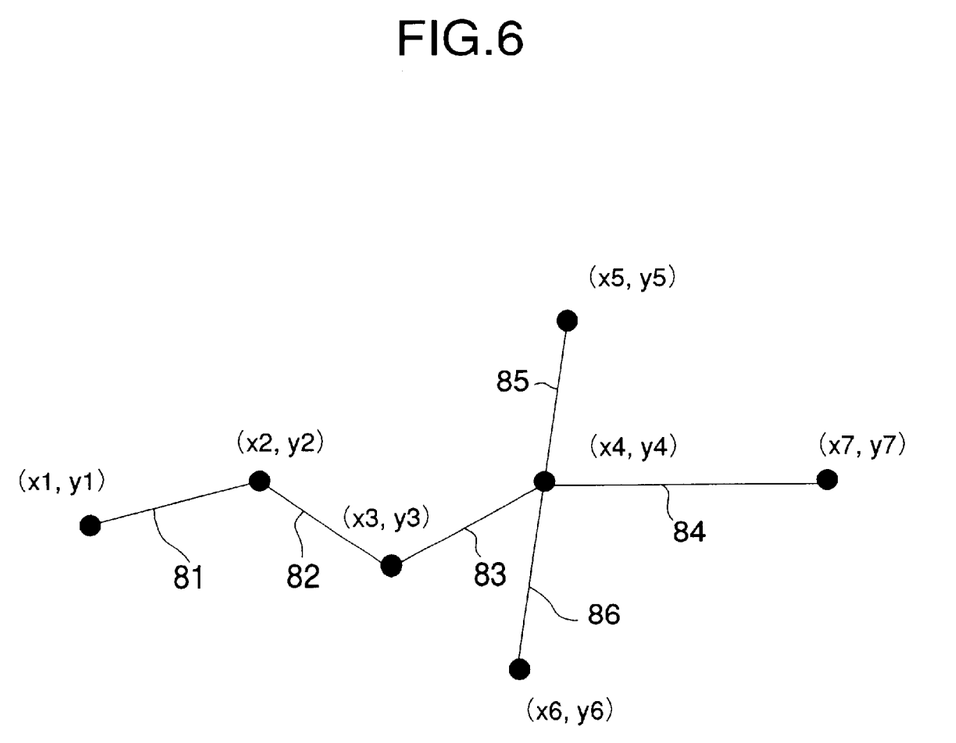
FIG. 6 is an illustration showing a format for representing the roads of the map data used in the embodiment of the present invention.

The road data can be approximated by a plurality of line segments, e.g., segments 81 to 86 as shown in FIG. 6, each of which is represented by a pair of coordinates, etc., of the starting point and the terminal point of the line segment. For example, the line segment 83 is represented by the starting point (x3, y3) and the terminal point (x4, y4).

Next, only the line segments, whose directions are within the predetermined range with respect to the given headed direction, are extracted from the line segments outputted in step 503 (step 504). In addition, perpendicular lines are drawn from the current position (A) to all the extracted line segments, and the lengths of perpendicular lines are obtained (step 505).

Next, those lengths of the perpendicular lines are used for calculating an error index value, defined in the following, for each of all the line segments extracted in step 504.

ERROR INDEX=α×|HEADED DIRECTION−LINE SEGMENT DIRECTION|+β×|LENGTH OF THE PERPENDICULAR LINE|

Here, α and β are defined as weighting factors. The values of these factors may be varied depending on which is more important in the event of selecting a road where the current position exists, the difference between the headed direction and the road direction or the difference between the current position and the road position. For example, if a road, whose direction is close to the headed direction, is to be selected, the value of α should be made larger.

After an error index of each line segment is calculated, a line segment having the lowest error index is selected (step 506), and a point of intersection of the selected line segment and the perpendicular line (the foot of the perpendicular line) is determined as a corrected current position (B) (step 507).

In step 503 as described above, road data (line segments) within the area of a predetermined distance D, the center thereof being the current position (A), have been extracted. Alternatively, the distance D may be a value determined according to the error index amount of the road which has been selected in the previous step 506.

The reason why the range for searching may be determined according to the error index amount is that if the error index amount is large, the accuracy of the previously obtained current position (B) may not be reliable, and thus a wider range for searching a road is preferable in obtaining an accurate current position.

As a third process, the process for displaying the obtained position and direction of a vehicle will be described.

Figure 5:
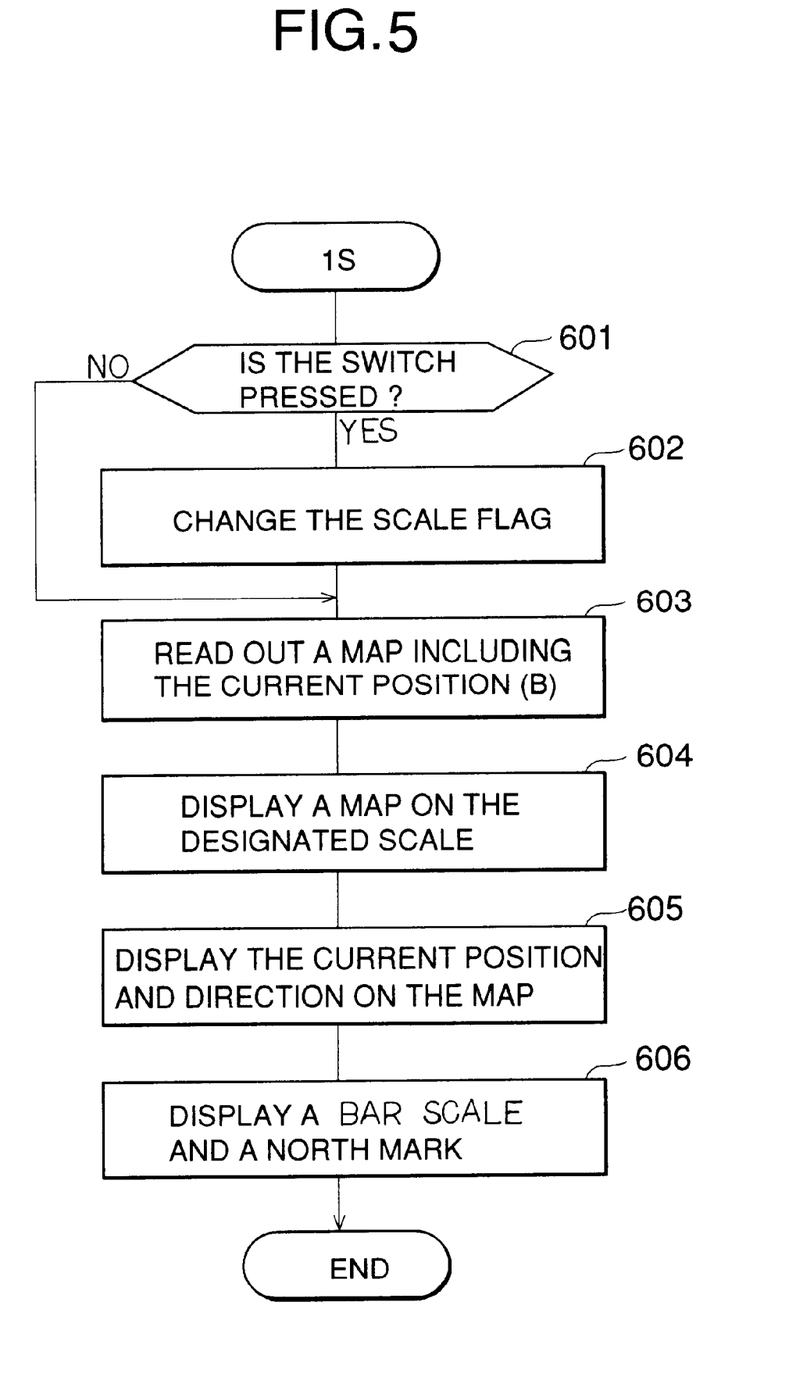
FIG. 5 is a flow chart showing a process of the current position display in the embodiment of the present invention.

FIG. 5 shows the flow of the process.

This process is a routine of the microprocessor 214, being started up and executed every second.

At first, according to the output from the parallel I/O 211, it is determined whether or not the switch 204 has been pressed so as to instruct to change the scale of the map (step 601). If it is pressed ("Yes" in step 601), a prepared scale flag is set (step 602) corresponding to the instruction.

Next, the current position (B) obtained in the process of FIG. 4 is read out (step 603) and the map on the scale which may have been switched according to the contents of the scale flag in step 602 is displayed on the display 207, for example, as shown in FIG. 2 (step 604). The current position (B) and the headed direction of the vehicle are displayed, for example, with an arrow sign "↑" on the already-displayed map, as shown in FIG. 2 (step 605). Finally, a mark indicating the north direction and a bar scale for representing a distance corresponding to the scale are overlaid on the map, as shown in FIG. 2 (step 606).

In this embodiment, an arrow sign is used, as described above, to indicate the vehicle position and direction. However, the method of indicating a vehicle position and direction can be decided optionally, as long as the position and the headed direction are definitely indicated. A mark indicating the north direction, etc., can be similarly varied.

Referring next to FIG. 3, a method for obtaining the distance factor R which is used for calculating a distance in step 405 will be described.

As described above, the travelled distance of a vehicle is obtained by multiplying the number of pulses outputted from the vehicle speed sensor 203 by the distance factor R. However, the travelled distance per revolution of a tire varies due to such factors as wearing away of the tire, and therefore if the distance factor is defined as a fixed value, the distance is not accurately obtained as the vehicle travels. Thus, in the embodiment of the present invention, it is decided whether a current position (B) is ahead or behind with respect to an actual position, by sequentially comparing a road direction obtained from the current position (B) calculated in the process shown in FIG. 4 (step 508) and the map data read out from the CD-ROM 205 via the driver 206, with a vehicle direction obtained in the process shown in FIG. 3 (step 403), so as to dynamically correct the distance factor R.

By way of example, the distance factor R is can be corrected as follows.

There are introduced a correcting variable Rsh for correcting the distance factor R in the short term and a correcting variable Ra for correcting the distance factor R in the long term. The distance factor R is dynamically corrected in accordance with:

DISTANCE FACTOR $R = R0 \times (1 + Ra + Rsh)$.

Here, R0 represents a predetermined initial value of the distance factor R.

Figure 7:
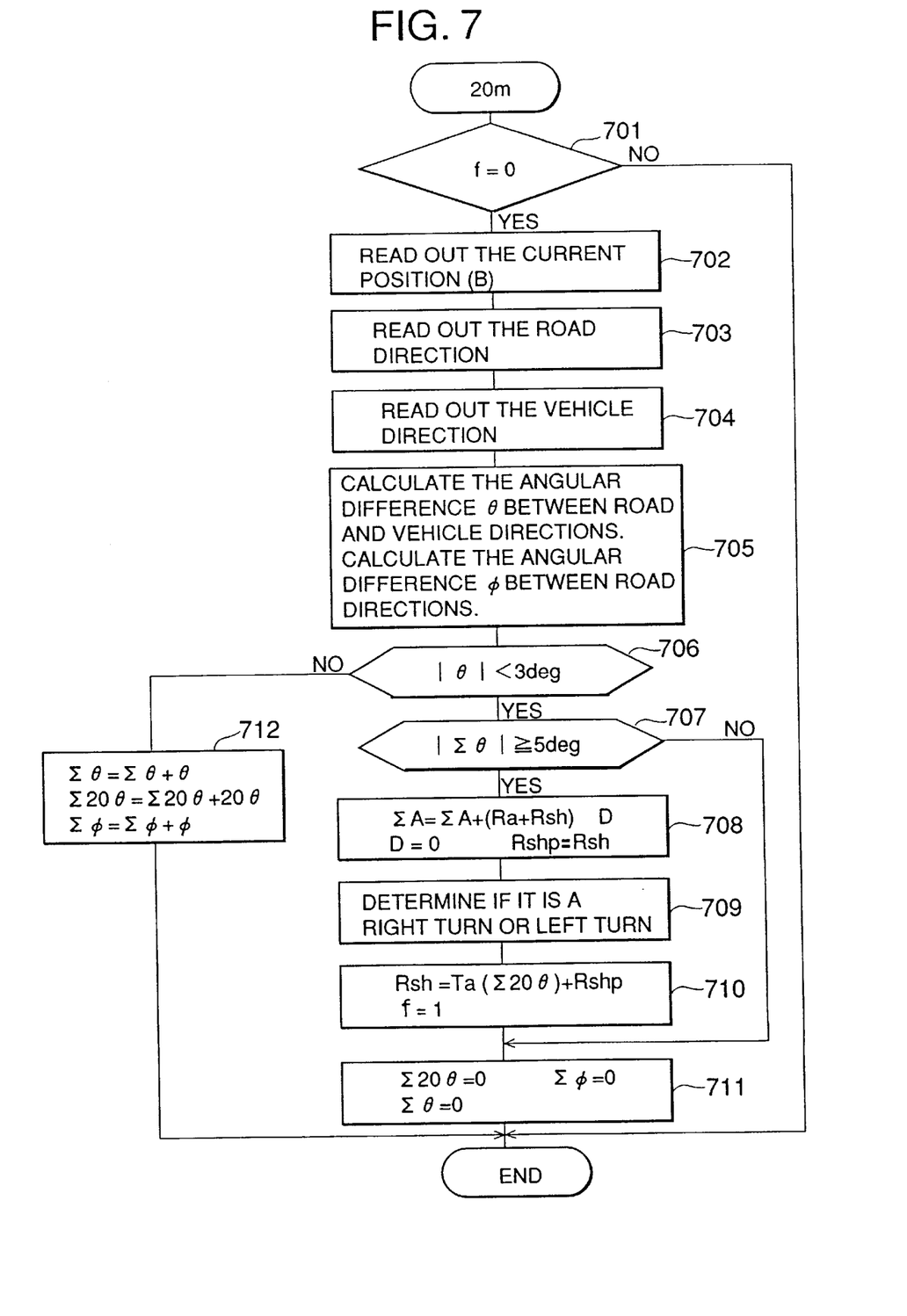
FIG. 7 is a first flow chart showing a process for correcting a distance factor in the embodiment of the present invention.
Figure 8:
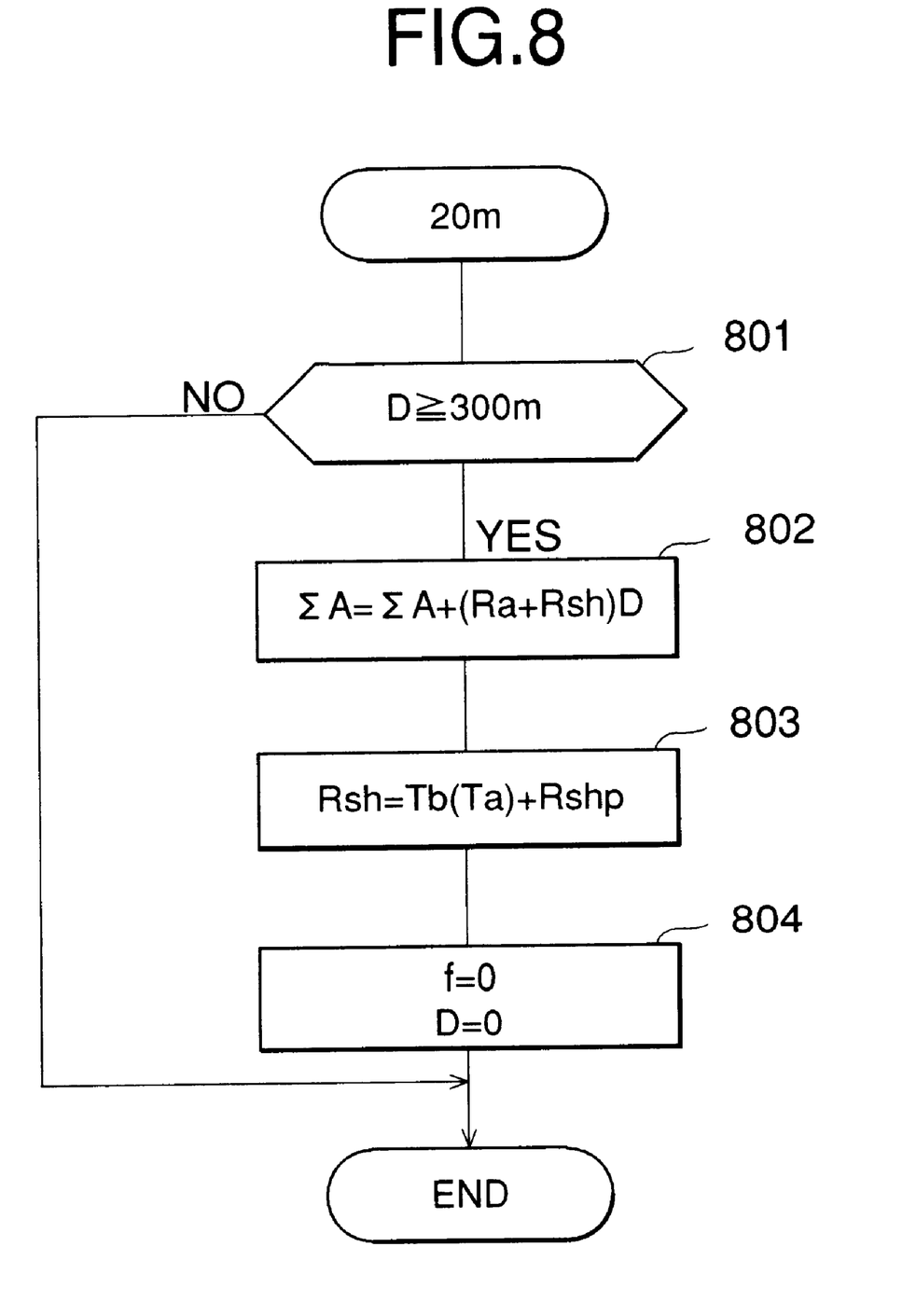
FIG. 8 is a second flow chart showing a process for correcting a distance factor in the embodiment of the present invention.
Figure 9:
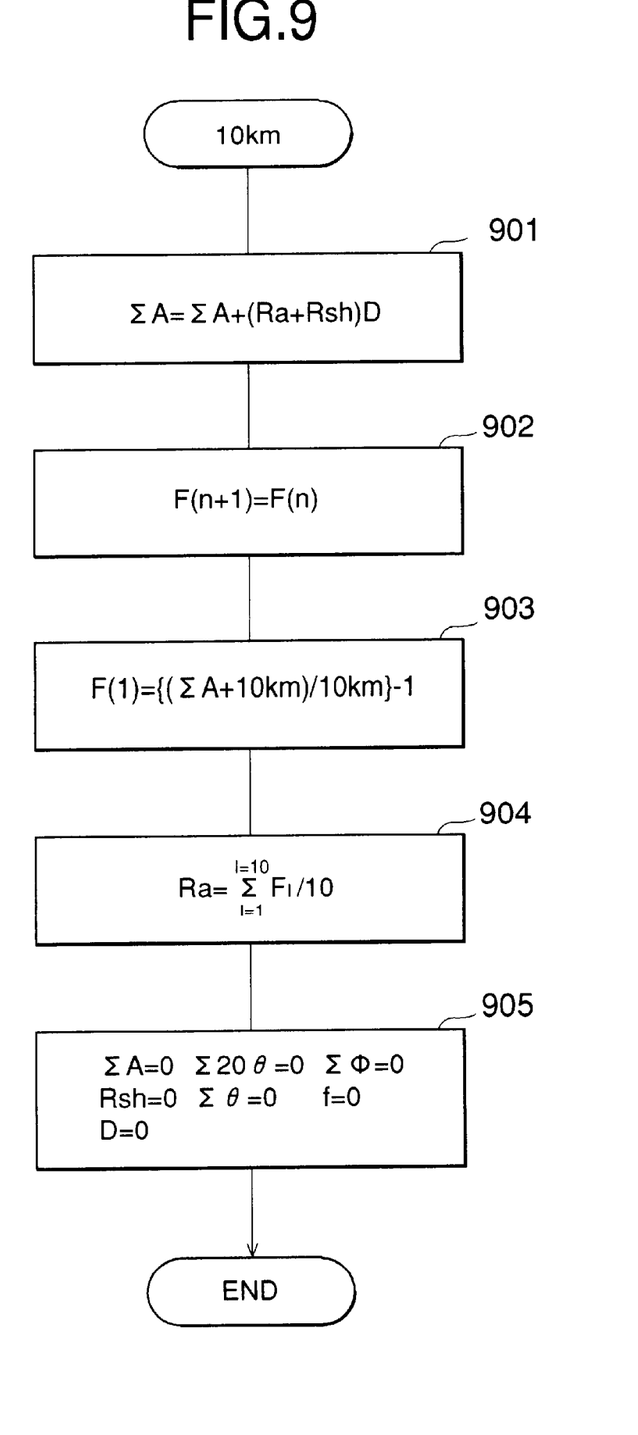
FIG. 9 is a third flow chart showing a process for correcting a distance factor in the embodiment of the present invention.

The microprocessor 214 sequentially modifies the correcting variables Rsh and Ra according to the processes shown in FIGS. 7, 8 and 9. Hereinafter, the processes shown in FIGS. 7, 8, and 9 will be described respectively, and it will be explained how the variables Rsh and Ra become modified through these processes in an actual driving.

First, when the system is started up, all variables and flags (f, $\Sigma\theta$, $\Sigma 20\theta$, $\Sigma\phi$, D, Rsh, Ra, $\Sigma A$, F1–F10) used in FIGS. 7, 8, and 9, which will be described below, are initialized to zero.

The process in FIG. 7 is triggered by receiving the output of the current position (B) from the process shown in FIG. 4, and is executed as a routine of the microprocessor 214. In other words, this process is started up every time a vehicle travels 20 meters.

In this process, it is initially determined whether or not flag f is zero and the process ends if it is not zero. On the other hand, if it is zero, the following values are read in; the current position (B) outputted from step 508 in FIG. 4, the road direction where the current position (B) is located, which has been obtained from the map data read out from the CD-ROM 205 via the driver 206, and the vehicle direction (estimated direction) outputted in step 403 in FIG. 3 (steps 702, 703 and 704).

Next, according to the above obtained values, an angular difference $\theta$ between road and vehicle directions and an angular difference $\phi$ between road directions are obtained (step 705). The angular difference $\theta$ between road and vehicle directions is defined as the difference between the road direction where the current position (B) is located and the vehicle direction, while, the angular difference $\phi$ between road directions is defined as the difference between the road direction obtained in step 703 the previous time, and the road direction obtained in step 703 this time. If the currently obtained road direction is on the left side with respect to the previously obtained road direction, the value of angular difference $\phi$ between road directions is set to positive. On the other hand, if the same is on the right side, the angular difference $\phi$ is set to negative. In terms of the angular difference $\theta$ between road and vehicle directions, it is set to positive if the vehicle direction is on the left side with respect to the road direction, for example, and it is set to negative if the vehicle direction is on the right side.

Next, it is checked whether or not an absolute value of the angular difference between road and vehicle directions obtained from step 705 is less than 3 deg (step 706). In the event that the absolute value is 3 deg or more ("No" in step 706), the following are performed in step 712: the value of $\Sigma\theta$ is updated by adding the angular difference $\theta$ between road and vehicle directions to an integral value $\Sigma\theta$ of angular difference between road and vehicle directions obtained in the previous process; the value of $\Sigma 20\theta$ is updated by adding to the previously obtained integral value $\Sigma 20\theta$ of angular difference between road and vehicle directions weighted by a travelled distance, the value which is the angular difference $\theta$ between the road and vehicle directions multiplied by 20 meters which is the travelled distance between the previous process and the current process; the value of $\Sigma\phi$ is updated by adding the currently obtained angular difference $\phi$ between road directions to the previously obtained integral value $\Sigma\phi$ of angular difference between road directions; and the process then ends.

On the other hand, in the event that the angular difference $\theta$ between road and vehicle directions is less than 3 deg ("Yes" in step 706), it is checked whether or not an absolute value of the integral value $\Sigma\theta$ of the current angular difference between the road and vehicle directions is 5 deg or more (step 707). If it is less than 5 deg ("No" in step 707), all the values of the integral $\Sigma$ of the angular difference between road and vehicle directions, the integral $\Sigma 20\theta$ of an angular difference between road and vehicle directions weighted by a travelled distance and the integral $\Sigma\phi$ of the angular difference between road directions are initialized to zero, and the process then ends "Yes" in step 706 indicates that the angular difference $\theta$ between road and vehicle directions becomes less than 3 deg after it has been 3 deg or more, successively two times or more.

If an absolute value of the integral value of an angular difference between road and vehicle directions is 5 deg or more ("Yes" in step 707), processes for modifying the aforementioned Rsh are performed in steps 708, 709 and 710.

In step 708, the current value of $\Sigma A$ is updated by adding the value of (Ra+Rsh) multiplied by a distance variable D, and the distance variable D is thereafter initialized to zero. Thus, (Ra+Rsh) is weighted by the distance travelled while Ra and Rsh are those values, and the result, D (Ra+Rsh) is accumulated to give $\Sigma A$. The distance variable D constantly indicates the distance a vehicle has travelled every after being initialized to zero. This distance is obtained by multiplying the number of pulses outputted from the vehicle speed sensor 203 by the distance factor R. Moreover, in step 708, the current value of Rsh at that time is stored as Rshp.

Next, in step 709, it is determined whether the travelled road has made a left turn or right turn during the period when the angular difference $\theta$ between road and vehicle directions continues to be at least 3 deg, according to the integral value $\Sigma\phi$ of angular difference between road directions. When the integral value $\Sigma\phi$ of angular difference between road directions is positive, it is determined to be a left turn and when the value is negative, it is determined to be a right turn.

Next, in step 710, the correcting variable Rsh is modified in accordance with the integral value $\Sigma 2\theta\theta$ of angular difference between road and vehicle directions weighted by a travelled distance and the result from step 709, a left turn or a right turn.

Hereinafter, it will be described how this modification is performed.

FIGS. 10A–10D show roads, current positions (B) and the angular differences θ between road and vehicle directions, in four cases, where the integral value $\Sigma 2\theta\theta$ of angular difference between road and vehicle directions weighted by a travelled distance is positive or negative, respectively, when the travelled roads have turned to the left or right, during the period when the angular differences θ between road and vehicle directions are continued to be at least 3 deg.

Figure 10A:
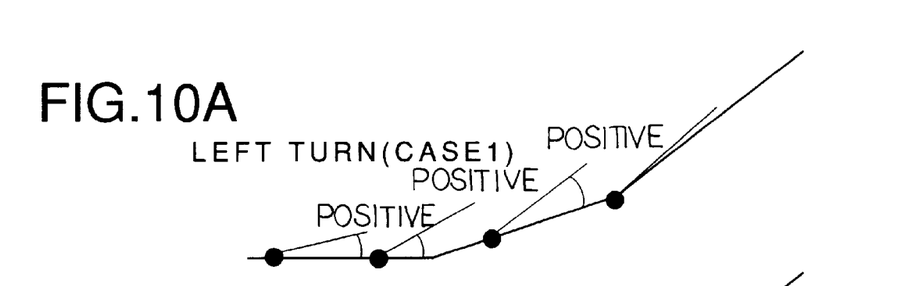
FIGS. 10A–10D are illustrations showing an angular difference between road and vehicle directions determined in the embodiment of the present invention.
Figure 10B:
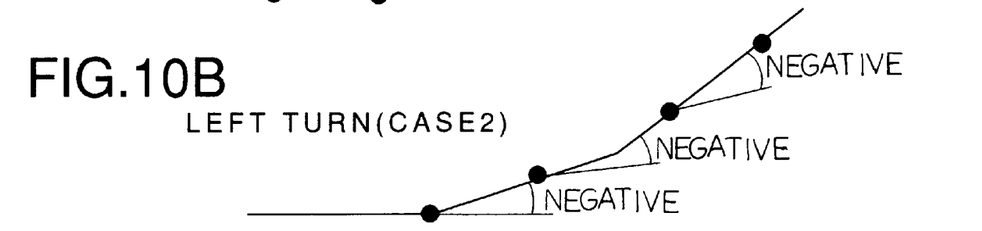

In FIG. 10A, case 1, it is shown that the integral value $\Sigma 2\theta\theta$ of angular difference between road and vehicle directions weighted by a travelled distance is positive, namely, the integral value $\Sigma\theta$ between road and vehicle directions is positive in the event of a left turn. In this case, the current positions (B) are behind the actual positions, since in reality a vehicle has already made a left turn before the current positions (B) reach the left turning point. On the other hand, in FIG. 10B, case 2, it is shown that the integral value $\Sigma 2\theta\theta$ of angular difference between road and vehicle directions weighted by a travelled distance is negative in the event of a left turn. In this case, the current positions (B) are ahead the actual positions, since in reality a vehicle has not made a left turn yet when the current positions (B) have reached the left turning point.

Figures 10C, 10D:
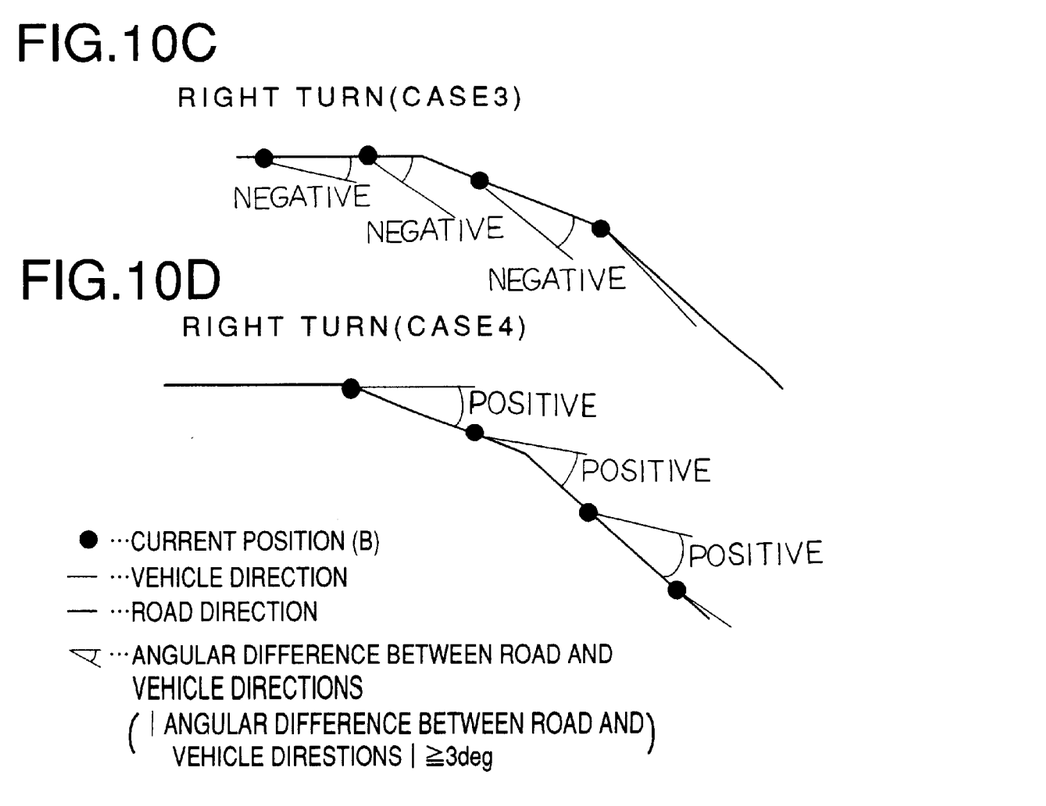

Similarly, in FIG. 10C, case 3, which is the case of a right turn, it is shown that when the integral value $\Sigma 2\theta\theta$ of angular difference between road and vehicle directions weighted by a travelled distance is negative, the current positions (B) are behind the actual positions, while, when it is positive, the current positions (B) are ahead the actual positions as shown in FIG. 10D, case 4.

Figure 11:
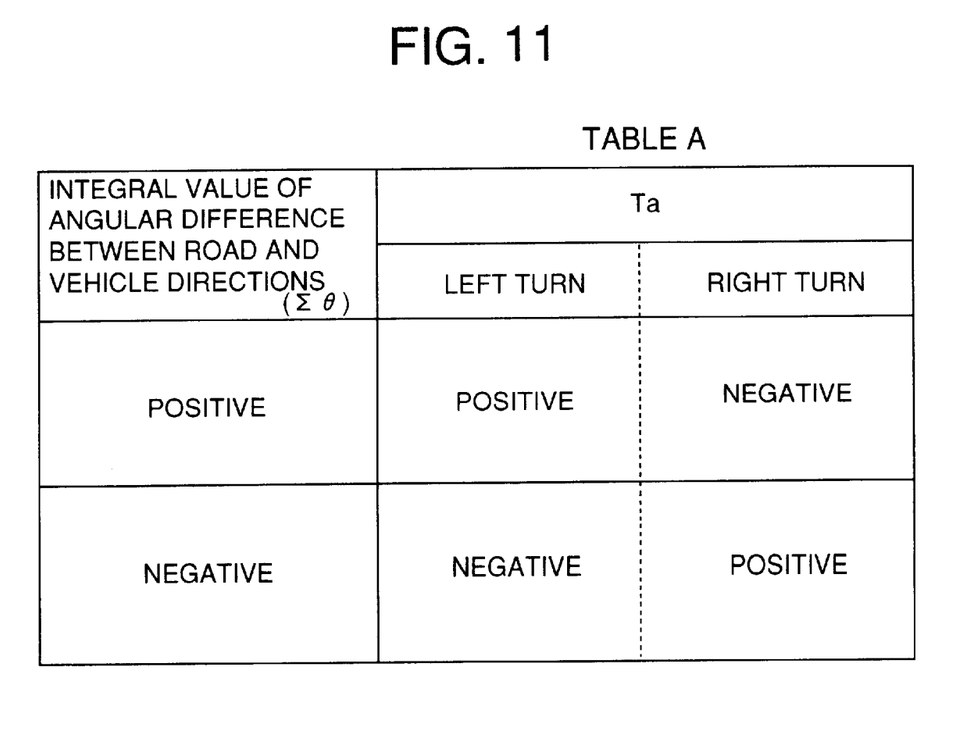
FIG. 11 is an illustration showing means for determining whether a variable Ta is positive or negative, which is calculated in the embodiment of the present invention.

As shown in FIG. 11, a variable Ta for modifying a correcting variable Rsh is determined to be positive or negative in accordance with the result of whether the integral value $\Sigma 2\theta\theta$ of angular difference between road and vehicle directions weighted by a travelled distance is positive or negative, and whether a turn has been determined to be left or right in step 709. Then, the absolute value of the variable Ta is determined in accordance with the absolute value of the integral value $\Sigma 2\theta\theta$ of angular difference between road and vehicle directions weighted by a travelled distance. The absolute value of the variable Ta is determined according to table A which has been prepared in advance. Table A is a table showing relationships between the absolute value of an integral value $\Sigma 2\theta\theta$ of angular difference between road and vehicle directions weighted by a travelled distance and the absolute value of variable Ta. In step 710, a value of variable Ta is determined according to the absolute value of variable Ta and also whether it is positive or negative. The value of Rsh is updated by adding the value of variable Ta to Rshp which has been stored in step 708, namely, the value of previous correcting variable Rsh. Moreover, once Rsh is modified, flag f is set to one.

After step 710 is completed, the integral value $\Sigma\theta$ of angular difference between road and vehicle directions, the integral value $\Sigma 2\theta\theta$ of angular difference between road and vehicle directions weighted by a travelled distance and the integral value $\Sigma\phi$ of angular difference between road directions are all initialized to zero in step 711 and the process ends.

FIG. 8 also shows a routine of the microprocessor 214, which is triggered by receiving the current position (B) outputted from the process in FIG. 4. That is, this process is executed every time a vehicle travels 20 meters.

In this process, it is firstly determined in step 801 whether or not the distance variable D is at least 300 meters. The distance variable D exceeds 300 meters when a vehicle travels 300 meters or more after being initialized to zero in step 708. If it is less than 300 meters, the process ends. When it exceeds 300 meters, $\Sigma A$ is updated by adding, to the current value of $\Sigma A$ at that time, the value of (Ra+Rsh) multiplied by the distance variable D (step 802), and Rsh is modified in accordance with Table B prepared in advance. In other words, an absolute value of variable Tb is obtained according to Table B and it is determined to be positive if variable Ta is positive, while it is determined to be negative if variable Ta is negative. In Table B, there are shown the relationships between the absolute values of variables Ta and Tb. These relationships are defined in such a manner that, a value which is obtained by reducing an absolute value of variable Ta at a predetermined rate is to be the absolute value of variable Tb.

Specifically variable Ta is defined to be approximately an order of magnitude greater than the corresponding variable Tb. Then, Rsh is updated by adding variable Tb to Rshp stored in step 708 in FIG. 7, namely, the previous correcting variable Rsh which is the value prior to the modification in step 710.

Finally, flag f and distance variable D are initialized and the process ends.

Next, FIG. 9 shows a routine of the microprocessor 214, which is started up and executed every time a vehicle travels 10 kilometers. This travelled distance, 10 kilometers, is obtained by multiplying the pulses outputted from the vehicle speed sensor 203 by the distance factor R.

In this process, firstly, $\Sigma A$ is updated by adding, to the current value of $\Sigma A$ at that time, the value of (Ra+Rsh) multiplied by the distance variable D (step 901). Then, nine variables, from F1 to F9 are updated to be F2 to F10 (step 902), respectively incremented by one, and a variable F1 is obtained in accordance with the following formula (step 903):

$$F1=\{(\Sigma A+10 \text{ km})/10\text{km}\}-1.$$

In step 904, the values from F1 to F10 are averaged and the averaged value is defined as correcting variable Ra thereafter.

Then, as a final step, each of the variables $\Sigma A$, $\Sigma 2\theta\theta$, $\Sigma\phi$, Rsh, $\Sigma\theta$, D, and flag f are initialized to zero and the process ends (step 905).

Up to this point, the processes for modifying the correcting variables Rsh and Ra have been described. Hereinafter, it will be explained how the variables Rsh and Ra are modified in accordance with these processes during actual driving.

Figure 12:
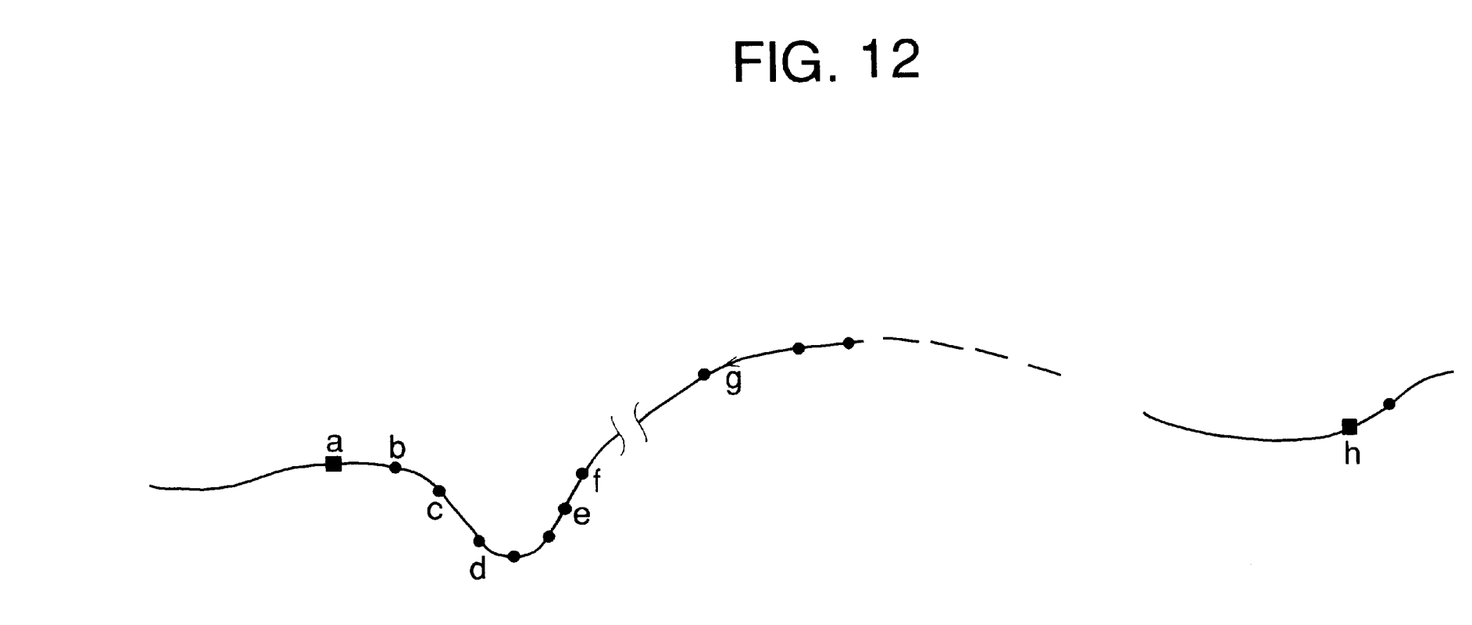
FIG. 12 is an illustration of a road to which a process for correcting a distance factor is applied in the embodiment of the present invention.

Here it is assumed that a vehicle is driving on the roads shown in FIG. 12.

It is assumed that at the point a in FIG. 12, the process shown in FIG. 9 is executed, the correcting variable Ra is modified and each of the variables $\Sigma A$, $\Sigma 2\theta\theta$, $\Sigma\phi$, Rsh, $\Sigma\theta$, D, and flag f are initialized to zero. It is also assumed that the angular difference θ between road and vehicle directions is less than 3 deg which has been calculated in step 705 in the process shown in FIG. 7, being started up every 20 meters from the point a to the point b. In this case, it is determined that the angular difference θ between road and vehicle directions is less than 3 deg from the point a to the point b in step 706 shown in FIG. 7, and $\Sigma\theta$ is determined to be less than 5 deg in step 707. Accordingly, the variables $\Sigma 2\theta\theta$, $\Sigma\phi$, and $\Sigma\theta$ are initialized to zero again. Thus, there is no change in these variables. In the meantime, the distance variable D increases in accordance with the travelled distance during this period. It is then assumed that the angular difference θ between road and vehicle directions has been 4 deg in the section of 20 meters from the point b to the point c, and has become less than 3 deg in the section of 20 meters from the point c to the point d. In this case, it is determined that the angular difference θ between road and vehicle directions is 3 deg or more in step 706 of the process shown in FIG. 7 which is executed at the point c, being 20 meters apart from the point b, and in step 712, the variables Σ2θ, Σφ, and Σθ are updated in accordance with the values of the angular difference θ between road and vehicle directions and the angular difference φ between road directions during the section of 20 meters. However, in the process shown in FIG. 7 executed at the point d which is 20 meters after point c, since it is determined that the angular difference θ between road and vehicle directions is less than 3 deg and the integral value Σθ of angular difference between road and vehicle directions is determined to be less than 5 deg, the variables Σ2θ, Σφ and Σθ are initialized to zero again in step 711.

As described above, in the process shown in FIG. 7, if the angular difference θ between road and vehicle directions is less than 3 deg, and the integral value Σθ of angular difference between road and vehicle directions is determined to be less than 5 deg, the variables Σ2θ, Σφ and Σθ are initialized. The object of this initialization is to ignore, in modifying the correcting variables Rsh and Ra in the subsequent processes, the angular differences between road and vehicle directions that are less than 3 deg, or those which have become 3 deg or more and less than 5 deg just once, not successively. This is because such angular differences may indicate errors due to other factors, besides an error in distance factor R.

Next, it is assumed that from point d to point e the angular difference θ between road and vehicle directions has become 3 deg or more, successively two times or more. In this case, the variables Σ2θ, Σφ and Σθ are sequentially updated in step 706 of the process shown in FIG. 7 executed between those points. As a result, at the point e, Σφ represents an integral value of the angular difference φ between road directions obtained between the point d and the point e, Σθ represents an integral value of the angular difference θ between road and vehicle directions obtained between the point d and the point e, and Σ2θ represents an integral value of the angular difference θ between road and vehicle directions weighted by a travelled distance obtained between the point d and the point e.

Next, it is assumed that the angular difference θ between road and vehicle directions is less than 3 deg within the section of 20 meters from the point e to the point f.

In this case, it is determined that the angular difference θ between road and vehicle directions is less than 3 deg in step 706 of the process shown in FIG. 7 executed at the point f which is 20 meters away from the point e, and that the integral value Σθ of angular difference between road and vehicle directions is 5 deg or more in step 707. Therefore, Rsh is updated in accordance with Σ2θ and Σφ in steps 709 and 710 as described above. Moreover, the distance variable D which represents a distance between the point a where the distance variable D is initialized and the point f, is multiplied by the sum of the correcting variables Ra and Rsh, (Ra+Rsh), and the resultant value is added to ΣA (zero at this timing). The distance variable D is also initialized to zero. The value of ΣA is used thereafter to obtain Ra in the process shown in FIG. 9. Then, Σ2θ, Σθ and Σφ which have been obtained in steps 709 and 710 to calculate Rsh, are initialized to zero.

Additionally, flag f is set to one in step 710, with the result that the process shown in FIG. 7 is substantially skipped in accordance with the decision in step 701, until the process shown in FIG. 8 is executed to reset the flag f to zero at the point g after driving 300 meters.

Next, at the point g where a vehicle has travelled 300 meters after initializing the distance variable D to zero at the point f, the distance variable D is determined to be 300 meters or more at step 801 in FIG. 8. The sum of the correcting variables (Ra+Rsh), which has been used since Rsh was modified at the point f, is multiplied by the distance variable D, the resultant value is added to ΣA, and Rsh is modified in step 803 as described above. As a result, in the 300 meters from the point f to the point g, the travelled distance is obtained using Rsh which has been calculated at the point f. After the point g, a value of Rsh, which is smaller than the value of Rsh obtained at the point 9, is to be used.

Accordingly, for the 300 meters from the point f, the distance factor R is intentionally made larger than an adequate value, by setting a correcting variable Rsh larger than an appropriate value, with the result that displacements of the current position (B) in which errors have been accumulated between the point a and the point f are gradually corrected while travelling the aforementioned 300 meters. After this process, it is possible to reset the distance factor R to an adequate value by making the correcting variable Rsh smaller. The displacements of the current position are gradually corrected while travelling 300 meters so as to establish a smooth movement of the displayed current position, without jumping or the like. During this 300 meters travelling, the process shown in FIG. 7 is not substantially executed since the process shown in FIG. 7 does not operate to obtain an appropriate value of Rsh while travelling with a distance factor R which has intentionally been made larger than an adequate value.

Next in step 804 in the process shown in FIG. 8, flag f and distance variable D are initialized to zero. Due to the initialization of flag f to zero, the process shown in FIG. 7 can substantially perform an operation in accordance with the angular difference θ between road and vehicle directions similarly to that in the section from the point a.

Subsequently, after 10 kilometers travelling from the point a, namely, reaching the point h, the process shown in FIG. 9 is executed.

In this process, the distance variable D (which represents a distance after obtaining the latest value of ΣA in step 708 or step 802) is initially multiplied by the sum of the correcting variables Ra and Rsh (Ra+Rsh) which have been used up to the present time and the result is added to ΣA (step 901). As a result, ΣA is a summation of each value of (Ra+Rsh)s weighted by the travelled distance when each of (Ra+Rsh)s is effective within 10 kilometers from the point a to the point f.

Next, in the data array F having the element data from F(1) to F(10), the respective element data the respective element data F(n), the initial value thereof being zero, is shifted to F(n+1) in such a manner that F(9) to F(10), F(8) to F(9) . . . and F(1) to F(2) (step 902). In step 903, {(ΣA+10 km)/10 km}−1 is set as F(1). Here, {(ΣA+10 km)/10 km}−1 is a value approximately proportional to a ratio of the distance corrected by the effects of Ra and Rsh which are included in the 10 kilometers measured from the point a to the point f. Thus, the averaged value from F(10) to F(1) obtained in step 904 is a value approximately proportional to the ratio of the distance corrected by the effects of Ra and Rsh which are included in the past 100 kilometers. Therefore, the averaged value can be defined as an updated Ra. Alternatively, the updated Ra can be the averaged value multiplied by an appropriate constant. Thereafter each of the variables ΣA, Σ2θ, Σφ, Rsh, Σθ, D and flag f are initialized to zero.

Subsequently, the same processes will be repeated as the processes from the point a.

In the meantime, as described above, since the variable Ta is set to be about an order of magnitude than the corresponding variable Tb, the variable Ta obtained in step 710 becomes about an order of magnitude than the value of previous Rsh. Therefore, in step 710, it is possible to use the variable Ta itself as an updated Rsh.

As explained above, an error of the distance factor R which is used for obtaining a travelled distance according to the difference between road and vehicle directions is estimated and corrected. Thus, specialized external equipment for correcting the distance factor R is not required. Also, adequate correction is possible even under any driving conditions, as well as driving on the roads with little features, such as intersections, etc. Therefore, a travelled distance can be calculated precisely at any time and a current position of a vehicle can be obtained with high accuracy.

As described above, according to the present invention, it is possible to provide a current position calculating system which can precisely correct a distance factor used for obtaining a travelled distance without considering a driving speed nor preparing any particular equipment, even while driving on a road with few characteristic features, and accordingly, can obtain a current vehicle position with high accuracy.

What is claimed is:

1. A vehicle position calculating system for calculating a current position of a vehicle, comprising:

means for storing map data representing a road map;

means for detecting a headed direction of the vehicle;

means for detecting a wheel rotational speed of the vehicle;

travel distance calculating means for calculating a travel distance of the vehicle in accordance with the detected wheel rotational speed and a distance factor;

means for estimating a current position of the vehicle in accordance with the calculated travel distance of the vehicle, the detected headed direction and the road map represented by said map data; and distance factor correction means for obtaining an angular difference between the detected headed direction and a direction of the road at the estimated current position of the vehicle on the road map represented by the map data, accumulating the angular differences obtained until the travel distance reaches a predetermined distance, and correcting the distance factor in accordance with the accumulated value.

2. A vehicle position calculating system for calculating a current position of a vehicle, comprising:

means for storing map data representing a road map;

means for detecting a headed direction of the vehicle;

means for detecting a wheel rotational speed of the vehicle;

travel distance calculating means for calculating a travel distance of the vehicle in accordance with the detected wheel rotational speed and a distance factor;

means for estimating a current position of the vehicle in accordance with the calculated travel distance of the vehicle, the detected headed direction and the road map represented by said map data; and distance factor correction means for obtaining a turning point of a road on which the estimated current position of the vehicle is located on the basis of the road map represented by said map data and correcting the distance factor such that when the detected headed direction of the vehicle indicates that the vehicle has made a turn when the estimated current position of the vehicle is before the obtained turning point, the distance factor is corrected to be a value greater than its current value, and when the detected headed direction of the vehicle indicates that the vehicle has made a turn when the estimated current position of the vehicle has passed the obtained turning point, the distance factor is corrected to be a value smaller than its current value, wherein, the distance factor correction means further determines whether a road on which the estimated current position of the vehicle is located turns to the right or to the left, on the basis of the road map represented by the map data, obtains a difference between the detected headed direction and a direction of the road at the estimated current position of the vehicle on the road map represented by the map data, decides whether the vehicle has made a turn ahead or behind a time when the estimated current position of the vehicle is at the turning point in accordance with the road map and the obtained difference of directions; and corrects the distance factor in accordance with the decision.

3. The vehicle position calculating system of claim 2 wherein the distance factor correction means corrects the distance factor with an amount the absolute value of which is in accordance with either the obtained difference of directions or an accumulated value of the obtained difference of directions.

4. The vehicle position calculating system of claim 3, wherein the distance factor correcting means conducts a first correction of the distance factor with an amount the absolute value of which is in accordance with the obtained difference of directions or the accumulated value of the difference of directions, maintains the value of the distance factor that has been corrected in the first correction during either a certain period of time or a period until the calculated travel distance indicates that the vehicle has travel a predetermined distance after the distance factor having been corrected in the first correction, and changes, after either of the periods has passed, the value of the distance factor to another value obtained by correcting the distance factor having been effective prior to the first correction, for an amount smaller than the amount with which the first correction has conducted and whose absolute value is in accordance with the obtained difference of directions or the accumulated value of the obtained difference of directions.

5. The vehicle position calculating system of claim 3 wherein the distance factor correction means accumulates an absolute amount with which the distance factor has been corrected in accordance with either the obtained difference of directions or the accumulated value of the obtained difference of directions, either until a number of times of correcting the distance factor reaches a predetermined number or until the travel distance reaches a predetermined distance, and replaces the distance factor with the value obtained in accordance with an average obtained by dividing the accumulated amount by a number of times of accumulation.

6. A vehicle position calculating method for calculating a current position of a vehicle including means for correcting a distance factor for obtaining a travel distance of the vehicle, comprising steps of:

estimating a current position of the vehicle on a road map represented by map data;

measuring a headed direction of the vehicle;

obtaining an angular difference between the measured headed direction and a direction of the road at the estimated current position;

accumulating the angular differences obtained until the travel distance of the vehicle reaches a predetermined distance; and correcting the distance factor in accordance with the accumulated value.

* * * * *